Figure 1:
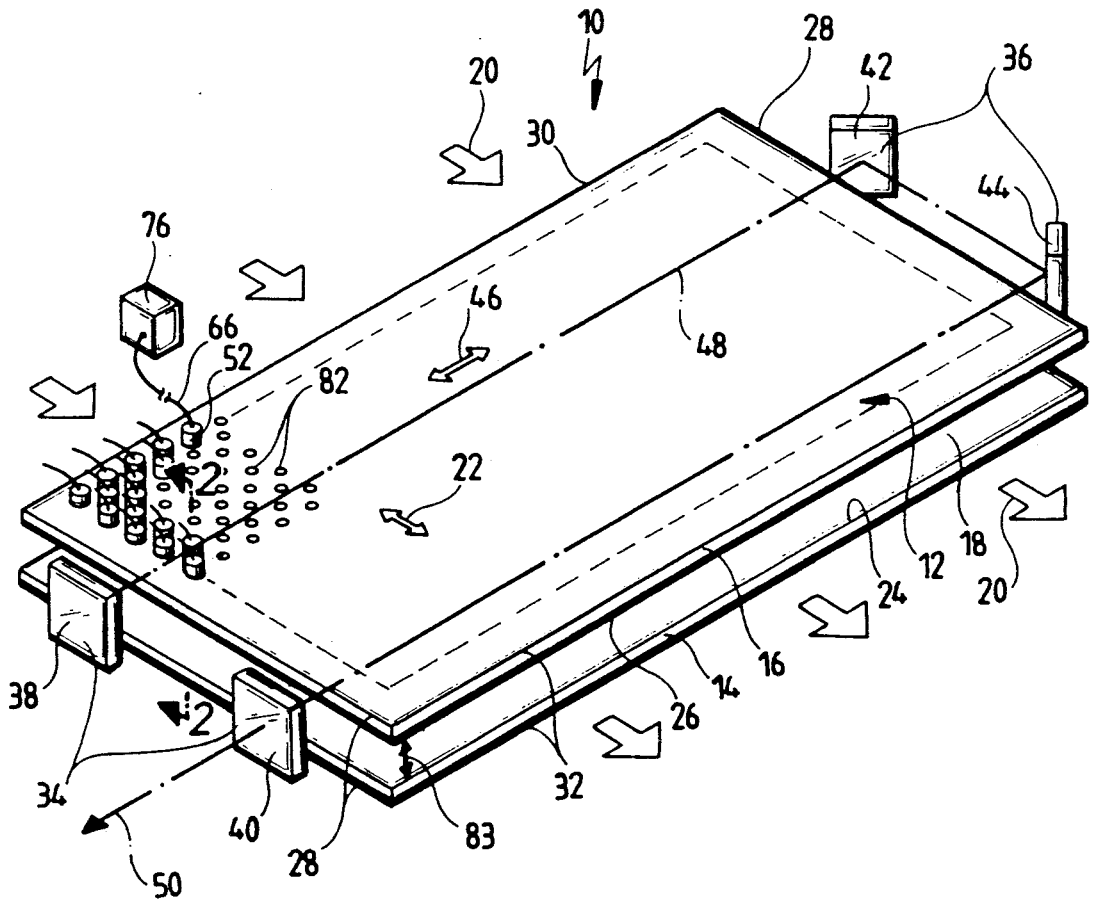

United States Patent [19]

Gekat

[11] Patent Number: 5,058,122
[45] Date of Patent: Oct. 15, 1991

[54] MICROWAVE-EXCITED HIGH-POWER LASER

[75] Inventor: Frank Gekat, Korb, Fed. Rep. of Germany

[73] Assignee: Deutsche Forschungsanstalt fuer Luft- und Raumfahrt e.V., Fed. Rep. of Germany

[21] Appl. No.: 609,936

[22] Filed: Nov. 6, 1990

[30] Foreign Application Priority Data

Nov. 10, 1989 [DE] Fed. Rep. of Germany ....... 3937490

[51] Int. Cl.⁵ .............................................. H01S 3/097
[52] U.S. Cl. ....................................... 372/82; 372/69; 372/93; 372/95; 372/83
[58] Field of Search ....................... 372/82, 93, 95, 69, 372/92

[56] References Cited

U.S. PATENT DOCUMENTS

| | | | |
|---|---|---|---|
| 4,513,424 | 4/1985 | Waynant et al. | 372/68 |
| 4,780,881 | 10/1988 | Zhang et al. | 378/77 |
| 4,987,577 | 1/1991 | Seunik et al. | 372/77 |

OTHER PUBLICATIONS

P. J. K. Wisoff et al., "Improved Performance of the Microwave-Pumped XeCl Laser", IEEE Journal of Quantum Electronics, vol. QE-18, No. 11, Nov. 1982, p. 1839.

*Primary Examiner*—Léon Scott, Jr.
*Attorney, Agent, or Firm*—Barry R. Lipsitz

[57] ABSTRACT

To provide more economical excitation of a high-power laser comprising a resonator having mirrors arranged in spaced, opposite relation to each other in the direction of a resonator axis and a beam path extending in both the direction of the resonator axis and a transverse direction perpendicular thereto, a gas-discharge volume permeated by the beam path and containing laser gas, and two facing wall surfaces extending substantially parallel to the resonator axis and to the transverse direction and enclosing between them and thereby delimiting the gas-discharge volume, it is propsoed that at least one wall surface be formed by a dielectric wall, that a microwave resonance structure separate from the laser gas in the gas-discharge volume be placed on the dielectric wall and have an opening facing the dielectric wall and bring about in an area of volume of the gas-discharge volume opposite the opening a microwave excitation of the laser gas, and that microwaves be introducible into the microwave resonance structure from a microwave source.

20 Claims, 3 Drawing Sheets

MICROWAVE-EXCITED HIGH-POWER LASER

The invention relates to a high-power laser comprising a resonator having mirrors arranged in spaced, opposite relation to each other in the direction of a resonator axis and a beam path extending in both the direction of the resonator axis and a transverse direction perpendicular thereto, a gas-discharge volume permeated by the beam path and containing laser gas, and facing wall surfaces extending substantially parallel to the resonator axis and to the transverse direction and enclosing between them and thereby delimiting the gas-discharge volume.

Such high-power lasers are known. However, the excitation of the laser gas in the gas-discharge volume has until now only been carried out by way of high frequency as excitation of the gas-discharge volume in an area of volume permeated by a beam path extending in a plane, i.e., in both the direction of the resonator axis and the transverse direction thereto was only possible with this type of excitation.

High-frequency excitation of a laser does, however, have the disadvantage of being very expensive, particularly in the case of high powers.

The object underlying the invention is, therefore, to provide a laser of the generic kind with a more economical excitation.

This object is accomplished in accordance with the invention by at least one wall surface being formed by a dielectric wall, by a microwave resonance structure separate from the laser gas in the gas-discharge volume being placed on the dielectric wall and having an opening facing the dielectric wall and bringing about in an area of volume of the gas-discharge volume opposite the opening a microwave excitation of the laser gas, and by microwaves being introducible into the microwave resonance structure from a microwave source.

The advantage of the inventive solution is to be seen in that microwave excitation is achieved in a simple way in a gas-discharge volume which is only delimited by two facing wall surfaces and hence constitutes a two-dimensional structure which is open at the sides and cannot form a resonator itself.

This results in an inventive high-power laser which is excitable in an economical way by microwaves.

It is particularly advantageous, above all, in order to achieve microwave excitation which is as uniform as possible in the gas-discharge volume for a plurality of microwave resonance structures to be placed on the dielectric wall. These microwave resonance structures can then be easily arranged with respect to their mutual spacing so as to provide microwave excitation which is as uniform as possible in the gas-discharge volume.

In this connection, it has proven particularly expedient for the microwave resonance structures to be arranged in a regular pattern as this provides a microwave excitation which is as uniform as possible in the gas-discharge volume.

Optimum adaptation of the microwaves to the beam path is possible by the microwave resonance structures being arranged in an area corresponding to the extent of the beam path in the direction of the resonator axis and in the transverse direction. In particular, in order to achieve microwave excitation of the laser gas which is as uniform as possible in the vertical direction, i.e., in the direction of the spacing of the two wall surfaces, provision is made for the microwave excitation between the wall surfaces of the gas-discharge volume to extend over these.

In the embodiments described hereinabove, it was assumed that microwave resonance structures are placed on one wall surface. In this case, the wall carrying this wall surface is of dielectric design and the opposite wall may be of dielectric design and metal-coated or it may be completely made of metal.

In an improved embodiment of the inventive solution, provision is, however, made for both wall surfaces to be formed by a dielectric wall and for at least one resonance structure to be placed on each of these so that the excitation of the laser gas in the gas-discharge volume takes place from two opposite sides. In this case, it is, for example, also possible for the microwave excitation not to extend over the entire gas-discharge volume between the wall surfaces, but, for example, for the microwave excitations of the two opposite resonance structures to supplement one another.

It is, however, particularly advantageous for a plurality of resonance structures to be placed on both dielectric walls in order to achieve in a particularly simple way with the arrangement of the plurality of resonance structures excitation of the laser gas which is as uniform as possible in the gas-discharge volume.

In this connection, it is particularly favorable for the resonance structures arranged on the opposite walls to be staggered in relation to one another so that the areas of volume associated with the respective microwave resonance structure do not coincide with one another.

It is, furthermore, expedient for the microwave resonance structures to be arranged in such patterns on the opposite walls that the resonance structures are placed in relation to one another so as to fill the gaps between the ones opposite them.

Within the scope of the inventive solution, an embodiment has proven particularly advantageous wherein each resonance structure has a microwave source of its own, preferably a magnetron, associated with it. In this case, in addition to achieving excitation of the laser gas in the gas-discharge volume which is as uniform as possible, the problem as to how several microwave sources of lower power are to be coupled with one another to excite a high-power laser is almost simultaneously solved. All complicated measures required, for example, to feed the power of several microwave sources into one single line are eliminated as the microwave sources influence one another mutually in the last-mentioned case and, in particular, also interfere with one another. This problem is fully solved by the resonance structure associated with each microwave source as mutual influencing of the microwave sources takes place by way of the resonance structures and hence, decoupled from one another, these can contribute with their full power to the excitation of the laser gas in the gas-discharge volume.

This enables use of the commercially available and favorably priced magnetrons known from household appliances for excitation of such a laser.

In the embodiments described hereinabove, no details were given as to the design of the resonance structures. It is particularly advantageous for the resonance structure to be a cylinder resonator. It is also preferable for the resonance structure to be a rectangular resonator.

The cylinder resonator is preferably arranged such that it is placed with an end face on the dielectric wall.

To achieve optimum coupling of the cylinder resonator to the gas-discharge volume, provision is made in the simplest case for the cylinder resonator to be open at the end face facing the dielectric wall. A connection between the microwave source and the resonance structure can be established in a particularly simple way by a coaxial pipe leading from the microwave source to the resonance structure.

In the embodiments described hereinabove, no details were given as to the wall surfaces delimiting the gas-discharge volume. In a preferred embodiment of the inventive high-power laser, provision is, for example, made for the wall surfaces to be optically reflecting waveguide surfaces of a waveguide extending between the mirrors essentially along the resonator axis. In this case, the inventive high-power laser is a so-called waveguide laser. In combination with this, it is also advantageous for the resonator to be an instable resonator.

In this particularly preferred embodiment, provision is also advantageously made for the gas-discharge volume to be filled with non-flowing laser gas and for the laser gas to be merely cooled by diffusion and interaction with the wall surfaces which are preferably cooled for this purpose.

As an alternative to this, in a further preferred embodiment of the inventive laser, provision is made for laser gas to flow through the gas-discharge volume. In this case, it is particularly expedient for laser gas to flow through the resonator in the transverse direction. In this instance, the inventive high-power laser is a transverse-flow-type laser which, in particular, requires a two-dimensional discharge structure open at the sides and formed exclusively by the two wall surfaces forming the gas-discharge volume and hence also the gas-discharge channel.

Good homogenization of the discharge is achievable, in particular, with a transverse-flow-type laser, by the microwave-excited areas of volume being arranged up-stream from the optical resonator so that the laser gas excited in these areas of volume is homogenized by the flow on its way to the optical resonator. In this case, it is particularly advantageous for there to be an area free of microwave excitation between the microwave-excited areas of volume and the resonator.

The resonator is preferably a folded resonator. In this case, it is, however, also possible for the resonator to be an instable resonator.

Figure 2:
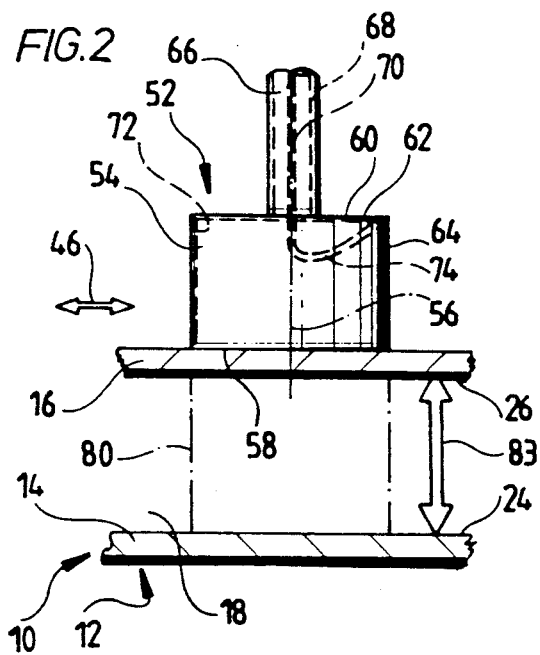
Figure 3:
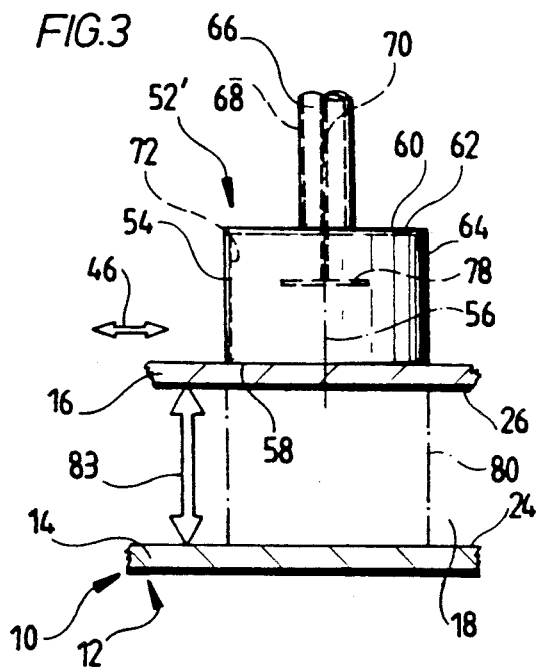
Figure 4:
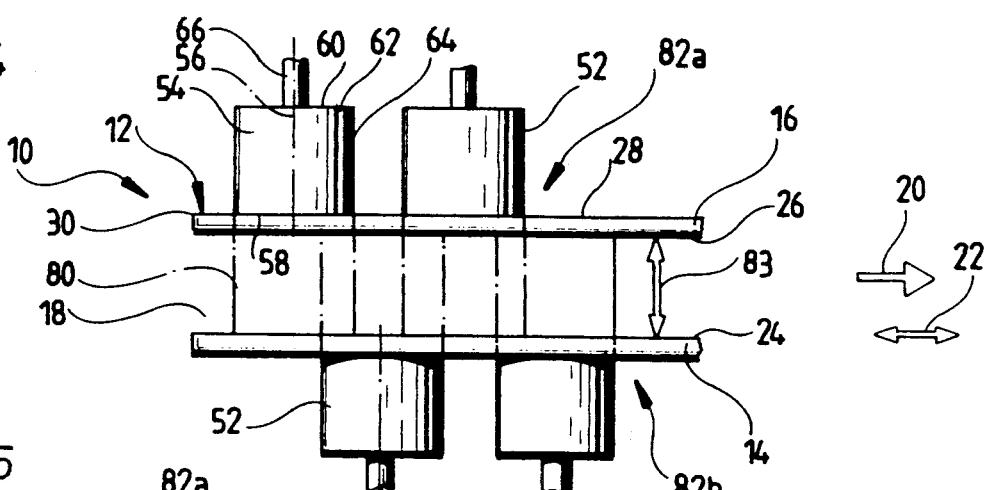
Figure 5:
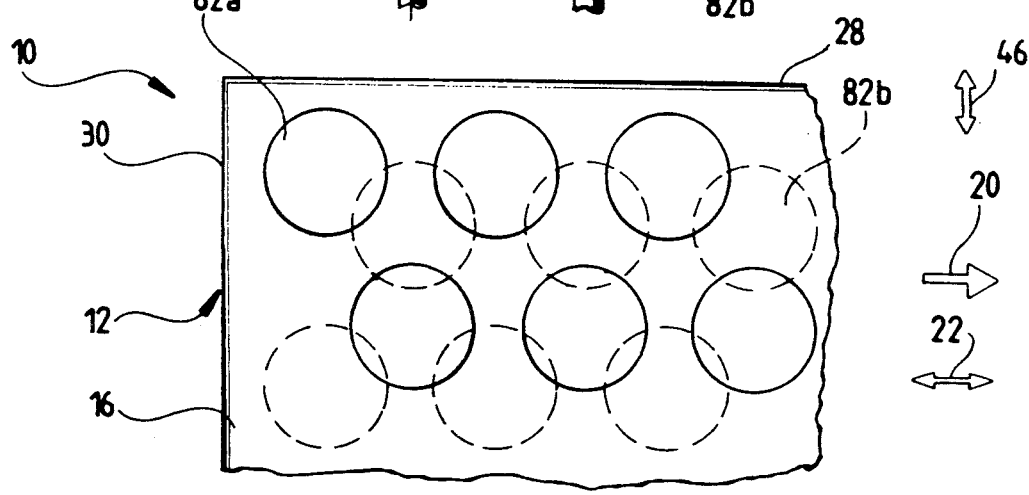
Figure 6:
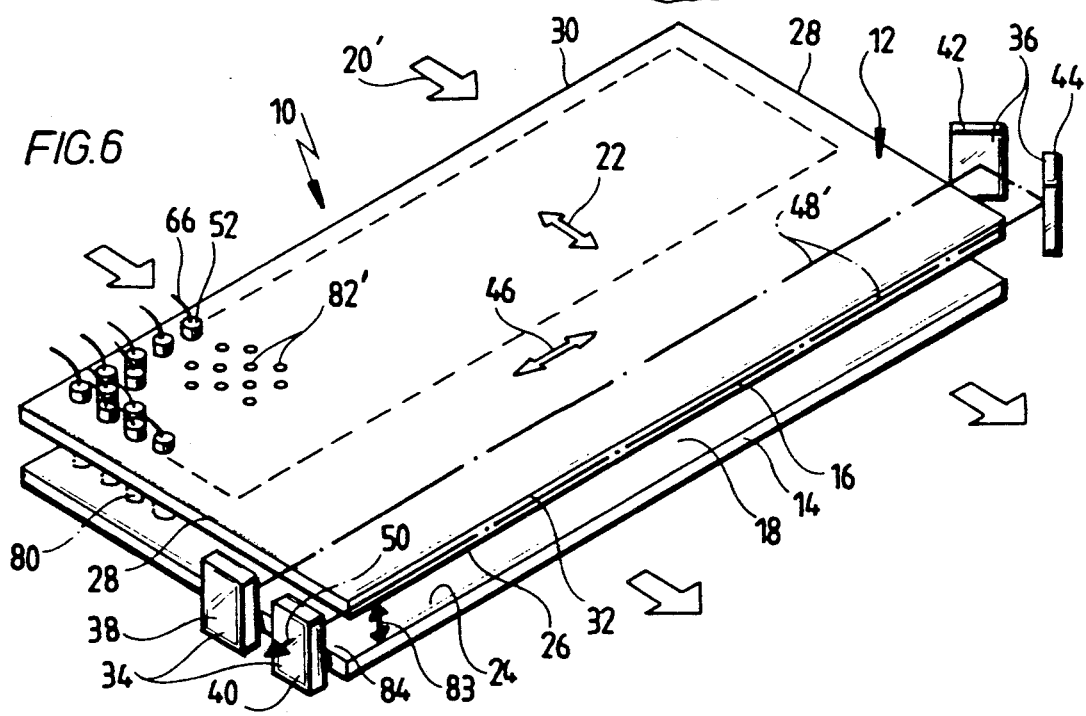
Figure 7:
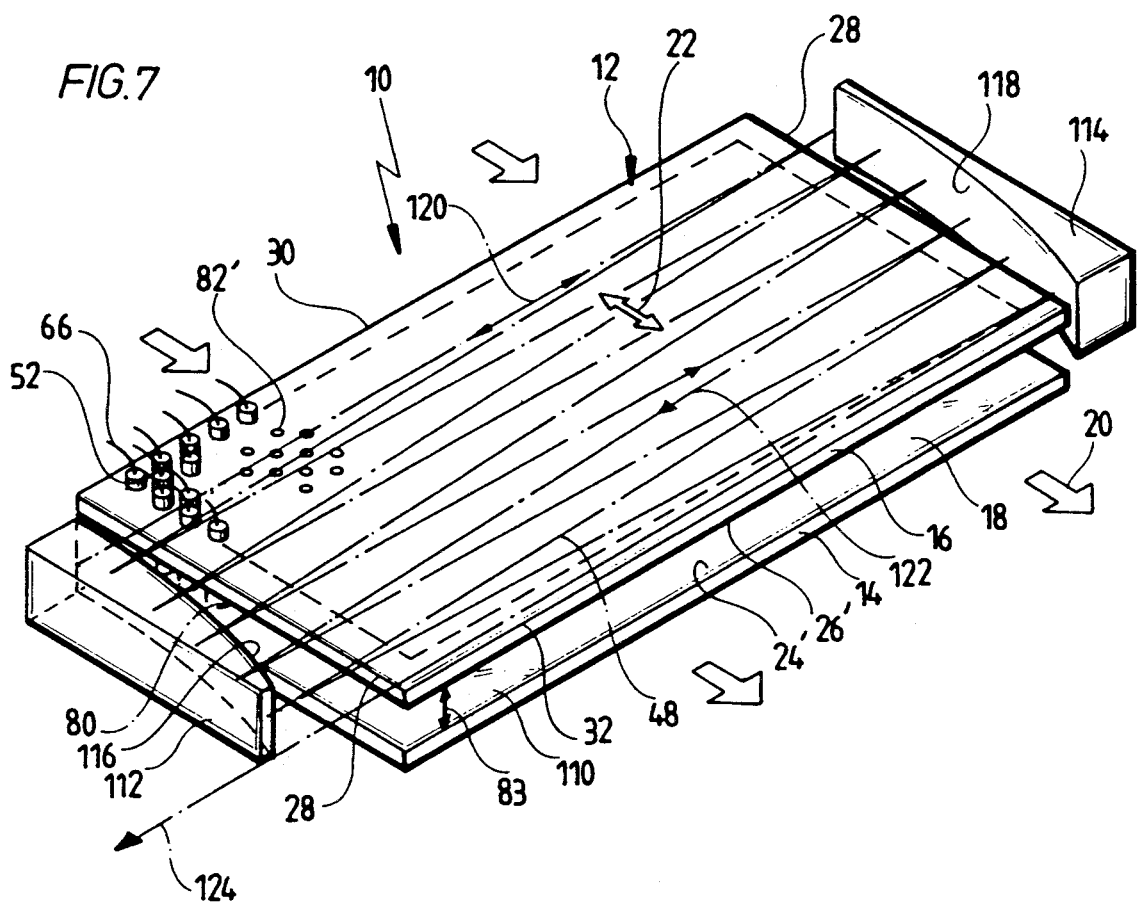

Further features and advantages of the inventive solution are to be found in the following description and the appended drawings of several embodiments. The drawings show:

FIG. 1 a perspective, schematic illustration of a first embodiment;

FIG. 2 a section along line 2—2 in FIG. 1;

FIG. 3 a sectional illustration similar to FIG. 2 of a variant of the first embodiment;

FIG. 4 a section similar to FIG. 2 through a further variant of the first embodiment;

FIG. 5 a plan view of the further variant illustrated in FIG. 4;

FIG. 6 a perspective, schematic illustration similar to FIG. 1 of a second embodiment; and FIG. 7 a perspective, schematic illustration similar to FIG. 1 of a third embodiment.

A first embodiment of an inventive high-power laser, designated in its entirety 10 in FIG. 1, comprises a discharge channel, designated in its entirety 12, which is formed by two parallel wall plates 14 and 16 enclosing a gas-discharge volume 18 between them. This gas-discharge volume 18 is permeated by a flow of laser gas in a transverse direction 22, as indicated by arrows 20, with the transverse direction 22 extending parallel to wall surfaces 24 and 26 of the wall plates 14 and 16 facing the gas-discharge volume 18 and preferably also parallel to a broad side edge 28 of the wall plates 14 and 16. The laser gas flow 20 enters the gas-discharge volume 18 throughout the entire longitudinal extent of the gas-discharge channel 12, i.e., between the longitudinal side edges 30 of the wall plates 14 and 16 and leaves the gas-discharge channel 12 again between longitudinal side edges 32 on the opposite side of the wall plates 14 and 16.

A resonator of the first embodiment of the inventive high-power laser comprises on opposite broad side edges 28 of the wall plates 14 and 16 sets of mirrors 34 and 36, respectively. The set of mirrors 34 comprises, for example, two single mirrors 38 and 40 aligned parallel to each other, while the set of mirrors 36 comprises, for example, two mirrors 42 and 44 facing each other and arranged at an angle of 45 degrees to the broad side edge 28 associated with them.

The sets of mirrors 34 and 36 form a resonator with a resonator axis 46 extending parallel to the longitudinal side edges 30 and 32 so that a laser beam 48 permeating the gas-discharge volume 18 extends, for example, from the mirror 38 in the direction of the resonator axis 46 to the mirror 42, is reflected by the mirror 42 onto the mirror 44 from which it proceeds in the direction of the resonator axis 46 again to the mirror 40. The mirror 40 is preferably of partially transmitting design so that part of the laser beam 48 is coupled out as exiting laser beam 50 from the mirror 40 and continues in the direction of the resonator axis 46 through the mirror 40.

The resonator illustrated in FIG. 1 represents only one embodiment of a resonator for a transverse-flow-type high-power laser. The resonator may, of course, also be folded several times so that the laser beam 48 is reflected back and forth several times as it passes through the gas-discharge volume 18 until part of it is coupled out as exiting laser beam 50. It is also conceivable for the resonator to be designed as optically instable resonator for a transverse-flow-type high-power laser.

To excite the laser gas flowing through the gas-discharge volume 18, at least one of the wall plates, for example, wall plate 16 in FIG. 1, is made of a dielectric material and a plurality of resonators 52 is placed directly on its side opposite the gas-discharge volume 18. As illustrated in FIG. 2, these are preferably designed as cylinder resonators and have a cylindrical resonator housing 54 which stands with a cylinder axis 56 preferably perpendicularly on the wall plate 16. An end face 58 of the resonator housing 54 facing the wall plate 16 is completely open towards the latter, while an end face 60 facing away from the wall plate 16 is closed by a cover 62 which is made in the same way as a cylinder jacket 64 of the resonator housing 54 of metal.

In accordance with the invention, a coaxial pipe 66 leads to the cover 62 and is connected with its outer conductor 68 to the cover 62, while an inner conductor 70 of the coaxial pipe 66 extends in an insulated manner through the cover 62 and leads in an interior 72 of the resonator housing 54 in the form of a coupling-in loop 74 to the cover 62 or to the cylinder jacket 64.

The coaxial pipe 66 of each resonator 52 leads to a microwave source, preferably a magnetron 76, associated with the resonator. Within the scope of the present invention, it is conceivable to supply several resonators from one microwave source 76. It is, however, particularly advantageous for each of the resonators to be supplied by one microwave source 76, in particular by a magnetron, so as to enable use of magnetrons which are commercially available at a favorable price for excitation of the inventive laser and, in particular, there is no necessity for any complicated measures as in such a case the magnetrons 76 influence one another mutually and interfere with one other in their function.

A further embodiment of an inventive resonator 52' is illustrated in FIG. 3. Insofar as the parts thereof are identical with those of the resonator 52 in FIG. 2, these bear the same reference numerals and so reference should also be had to the statements on the resonator 52 in FIG. 2. The resonator 52' differs from the resonator 52 solely in that instead of an inductive coupling in with the coupling-in loop 74, there is a capacitive coupling-in via a coupling-in web 78 which is connected to the inner conductor 70 and is insulated from the resonator housing 54.

Owing to the open end face 58, each of the resonators 52 and 52' brings about a microwave excitation in an area of volume 80 of the gas-discharge volume 18 opposite the end face 58. The area of volume 80 is of essentially cylindrical shape similar to the cylindrical resonator 52 and preferably extends from the dielectric wall plate 16 to the opposite wall plate 14, thereby filling out the entire gas-discharge volume 18 in the vertical direction 83.

In the first embodiment illustrated in FIG. 1, a plurality of resonators is arranged in a predetermined pattern 82 on the wall plate 16. The pattern 82 preferably extends in the transverse direction 22 to such an extent that it fully covers the region of the gas-discharge volume 18 permeated by the laser beam 48 essentially in this transverse direction 22 and also exhibits as large an extent as possible in the direction of the resonator axis 46.

In this first embodiment, the wall plate 14 may be made of dielectric material and is then preferably also metal-coated or it may be made entirely of metal in order to form a reflecting wall for the microwaves coupled-in from the wall plate 16.

In a variant of the first embodiment, illustrated in FIGS. 4 and 5, provision is made for both wall plates 14 and 16 to be made of dielectric material and to carry resonators 52 or 52', with the resonators 52 being arranged in the same pattern 82 on the opposite wall plates 14 and 16, but with the patterns 82 being staggered in relation to each other so that the resonators 52 of the pattern 82a fill the gaps between the resonators 52 of the pattern 82b. Hence the areas of volume 80 in which microwave excitation is brought about by the resonators 52 in the gas-discharge volume 18 essentially overlap one another fully and substantially complete microwave excitation takes place in the gas-discharge volume 18.

In a second embodiment of an inventive high-power laser, illustrated in FIG. 6, wherein, in particular, a rapid laser gas flow 20' permeates the gas-discharge volume 18, insofar as the parts are identical with those of the first embodiment, these bear the same reference numerals and so reference is to be had to the statements on the first embodiment for a description of these.

In contrast with the first embodiment, the resonator is designed such that the laser beam 48' extends in a section 84 of the gas-discharge volume located downstream from the laser gas flow 20', and the pattern 82' extends at least upstream from the section 84 so the excited areas of volume 80 lie at least upstream from the section 84 and may possibly also extend into the section 84.

Consequently, in particular with a rapid laser gas flow 20, the laser gas is fully excited and homogeneously mixed by the flow before entering the section 84 permeated by the resonator and by the laser beam 48' and hence a coherent radiation with maximum possible power can form in the section 84. The intensity with which and the length of time during which the laser gas is excited before entering the section 84 is freely selectable depending on the extent of the pattern 82' upstream in the transverse direction 22. It is particularly expedient for there to be an area free of microwave excitation between the areas of volume 80 of the pattern 82' and the section 84.

In a third embodiment of the inventive high-power laser, illustrated in FIG. 7, those parts identical with those of the first embodiment bear the same reference numerals and so reference is to be had in full to the statements on the first embodiment for a description of these.

In contrast with the first embodiment, the wall plates 14 and 16 serve not only to delimit the gas-discharge volume 18 but are simultaneously provided with wall surfaces 24' and 26' optically reflecting a laser beam so the two wall plates 14 and 16 form with the wall surfaces 24' and 26' a waveguide designated in its entirety 110 with the additional requirement that the wall surfaces 24' and 26' be arranged at a spacing from one another which is customary for a waveguide.

Furthermore, the resonator is designed as optically instable resonator comprising a convex mirror 112 associated with a broad side edge 28 and a concave mirror 114 associated with the opposite broad side edge 28. The convex mirror 112 and the concave mirror 114 have facing, preferably confocal mirror surfaces 116 and 118 which are preferably of cylindrical design, i.e., flat in the vertical direction 83. A resonator is particularly preferred wherein the mirror surfaces 116 and 118 are designed so as to form half of a symmetrical, instable resonator and so a resonator axis 120 of this instable resonator extends, for example, from the left side edge of the mirror surface 116 in FIG. 7 to, for example, the left side edge of the mirror surface 118, with the mirror surfaces 116 and 118 standing at the point of intersection with the resonator axis 120 perpendicularly on the latter.

Owing to the design of the mirror surfaces 116 and 118, a beam path 122 is formed by increasing reflection back and forth and propagates in the transverse direction 22 from the resonator axis 120 to the right. It then goes over into an exiting laser beam 124 which passes at the side of the convex mirror 112, the latter having a lesser extent in the transverse direction 22 than the concave mirror 114.

There is also preferably no flow through the gas-discharge volume 18, but instead this is filled with non-flowing laser gas and so all the devices for bringing about a transverse flow in the gas-discharge volume 18 are dispensed with.

As in the first embodiment, provision is made within the scope of a first variant of the third embodiment for the resonators 52 to be arranged only on the wall plate 16 which may be of corresponding dielectric design, while the wall plate 14 may, in this case, be made of metal or of a metal-coated dielectric material.

The pattern 82 is to be made to cover at least the resonator axis 120 in order to make it possible for the resonator to start oscillating in the resonator axis 120. Furthermore, the pattern 82" should extend as far as possible in the transverse direction 22 and cover the beam path 122 in the transverse direction 22 as fully as possible. It is also advantageous for the pattern 82" to extend as far as possible in the direction of the resonator axis 120.

In a further variant, provision may be made, as illustrated in FIGS. 4 and 5, for both the wall plate 14 and the wall plate 16 to carry resonators 52 in correspondingly staggered patterns 82a and 82b.

The present disclosure relates to the subject matter disclosed in German application No. P 39 37 490.4 of Nov. 10, 1989, the entire specification of which is incorporated herein by reference.

What is claimed is:

1. A high-power laser comprising a resonator having mirrors arranged in spaced, opposite relation to each other in the direction of a resonator axis and a beam path extending in both the direction of said resonator axis and a transverse direction perpendicular thereto, a gas-discharge volume permeated by said beam path and containing laser gas, and two facing wall surfaces extending substantially parallel to said resonator axis and to said transverse direction and enclosing between them and thereby delimiting said gas-discharge volume, characterized in that at least one wall surface (24, 26) is formed by a dielectric wall (14, 16), in that a microwave resonance structure (52) separate from said laser gas in said gas-discharge volume (18) is placed on said dielectric wall (14, 16), said microwave resonance structure having an opening facing said dielectric wall (14, 16) and bringing about in an area of volume (80) of said gas-discharge volume (18) opposite said opening a microwave excitation of said laser gas, and in that microwaves can be introduced into said microwave resonance structure (52) from a microwave source (76).

2. A high-power laser as defined in claim 1, characterized in that a plurality of microwave resonance structures (52) is placed on said dielectric wall (14, 16).

3. A high-power laser as defined in claim 2, characterized in that said microwave resonance structures (52) are arranged in a regular pattern (82a, b).

4. A high-power laser as defined in claim 2, characterized in that said microwave resonance structures (52) are arranged in an area corresponding to the extent of the path of said beam (48, 122) in the direction of said resonator axis (46, 120) and in said transverse direction (22).

5. A high-power laser as defined in claim 1, characterized in that said microwave excitation extends between said wall surfaces (24, 26) of said gas-discharge volume (18) over these.

6. A high-power laser as defined in claim 1, characterized in that both wall surfaces (24, 26) are formed by a dielectric wall (14, 16), and in that at least one resonance structure (52) is placed on each of said wall surfaces.

7. A high-power laser as defined in claim 6, characterized in that a plurality of resonance structures (52) is placed on both dielectric walls (14, 16).

8. A high-power laser as defined in claim 6, characterized in that said resonance structures (52) arranged on opposite walls (14, 16) are staggered in relation to one another.

9. A high-power laser as defined in claim 1, characterized in that each resonance structure (52) is associated with a microwave source (76) of its own.

10. A high-power laser as defined in claim 1, characterized in that said resonance structure (52) is a cylinder resonator.

11. A high-power laser as defined in claim 10, characterized in that said cylinder resonator (52) is placed with an end face (58) on said dielectric wall (14, 16).

12. A high-power laser as defined in claim 11, characterized in that said cylinder resonator (52) is open on said end face (58) facing said dielectric wall (14, 16).

13. A high-power laser as defined in claim 1, characterized in that a coaxial pipe (66) leads from said microwave source to said resonance structure.

14. A high-power laser as defined in claim 1, characterized in that said wall surfaces (24', 26') are designed as optically reflecting waveguide surfaces of a waveguide (110) extending between said mirrors (112, 114) substantially along said resonator axis (120).

15. A high-power laser as defined in claim 1, characterized in that said resonator is an unstable resonator.

16. A high-power laser as defined in claim 1, characterized in that laser gas flows through said gas-discharge volume (18).

17. A high-power laser as defined in claim 16, characterized in that laser gas flows through said resonator in said transverse direction (22).

18. A high-power laser as defined in claim 16, characterized in that said microwave-excited areas of volume (80) are arranged upstream from said resonator.

19. A high-power laser as defined in claim 18, characterized in that there is an area between said microwave-excited area of volume (80) and said resonator which is free of microwave excitation.

20. A high-power laser as defined in claim 1, characterized in that said resonator is a folded resonator.

* * * * *